United States Patent [19]

Nakamura et al.

[11] Patent Number: 4,746,462
[45] Date of Patent: May 24, 1988

[54] PHOSPHORIC ESTER COMPOUND

[75] Inventors: Michiei Nakamura, Soka; Hitoshi Takeuchi, Saitama; Tetujiro Takahashi; Minoru Takizawa, both of Koshigaya; Shojiro Horiguchi, Omiya, all of Japan

[73] Assignee: Dainichiseika Color & Chemicals Mfg. Co., Ltd., Tokyo, Japan

[21] Appl. No.: 824,577

[22] Filed: Jan. 23, 1986

[30] Foreign Application Priority Data

Feb. 21, 1985 [JP] Japan .................................. 60-033492
Sep. 25, 1985 [JP] Japan .................................. 60-210291

[51] Int. Cl.$^4$ .............................................. C07F 9/09
[52] U.S. Cl. ..................................... 260/403; 558/180
[58] Field of Search ................. 260/403; 558/135, 180

[56] References Cited

U.S. PATENT DOCUMENTS 4,101,432 7/1978 Okoroduda ........................ 558/180
4,469,635 9/1984 Peterson .............................. 260/403

OTHER PUBLICATIONS

Bennett, "Concise Chemical and Technical Dictionary", (1974), p. 564.

Primary Examiner—Anton H. Sutto
Attorney, Agent, or Firm—Oblon, Fisher, Spivak, McClelland & Maier

[57] ABSTRACT

There is provided a new phosphoric ester compound represented by the formula below.

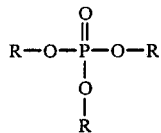

(where one or more than one of the three R's are hydroxyl-terminated polyester residues obtained by self-polycondensation of a hydroxy-carboxylic acid; and one or two of the three R's, in case of being remained, are hydrogen atoms, cations, or residues of an alcohol excluding the above-mentioned polyesters.)

5 Claims, No Drawings

PHOSPHORIC ESTER COMPOUND

BACKGROUND OF THE INVENTION

1. Field of the Invention

The present invention relates to a new phosphoric ester compound and, more particularly, to a phosphoric ester compound containing a polyester chain useful as a pigment dispersant or flushing agent in the production of a pigment composition useful as a coloring material such as paint, printing ink, or a synthetic resin colorant.

2. Description of the Prior Art

In the conventional process for producing paints and printing inks, lecithin, which is one of phospholipids, has been used both as a dispersant for dispersing a pigment into a paint vehicle or printing ink varnish, and as a flushing agent for flushing the aqueous filter cake into an oil vehicle or oil varnish.

Being a natural phospholipid, lecithin is liable to oxidation and rancidity which lead to deterioration and putrefaction. Thus there has been a demand for a dispersant or flushing agent which is stabler and better than lecithin.

In view of the above-mentioned drawbacks of the conventional dispersant or flushing agent and in order to develop a new compound which is compatible with vehicles and varnishes and also with pigments and is useful as a pigment dispersant, the present inventors carried out a series of researches which led to the finding that a phosphoric ester obtained by reacting a polyester having a hydroxyl group with phosphoric acid exhibits outstanding properties and effects required for pigment dispersants. The present invention was completed based on this finding.

SUMMARY OF THE INVENTION

Accordingly, it is an object of the present invention to provide a new phosphoric ester compound wherein the phosphoric ester compound is represented by the formula below and useful for a pigment dispersant or flushing agent.

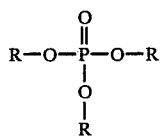

(where one or more than one of the three R's are hydroxyl-terminated polyester residues obtained by self-polycondensation of a hydroxy-carboxylic acid; and one or two of the three R's in case of being remained, are hydrogen atoms, cations, or residues of an alcohol excluding the above-mentioned polyesters.)

DETAILED DESCRIPTION OF THE INVENTION

The phosphoric ester compound which characterizes this invention is a specific phosphoric ester compound as defined above.

The phosphoric ester compound of this invention can be obtained by various methods. According to a preferred method, it is obtained by reacting 1 mole of an ester-forming phosphorus compound with 3 moles, 2 moles, or 1 mole of a hydroxyl-terminated polyester (obtained by self-polycondensation of hydroxy-carboxylic acid.)

It is also possible to produce the phosphoric ester compound of this invention by the process is which 1 mole of an ester-forming phosphorus compound is reacted with 3 to 1 mole of hydroxy-carboxylic acid or lower alcohol ester thereof as a monomer and the resulting ester of phosphoric acid and hydroxy-carboxylic acid undergoes chain growth with the same or different hydroxy-carboxylic acid monomer and/or hydroxyl-terminated polyester.

When 1 mole of an ester-forming phosphorus compound is reacted with 3 moles of a hydroxyl-terminated polyester, there is obtained a phosphoric ester compound in which all of the three R's in the above formula are a hydroxyl-terminated polyester residues. Also, when 1 mole of an ester-forming phosphorus compound is reacted with 2 moles or 1 mole of hydroxyl-terminated polyester, there is obtained a phosphoric ester compound in which two or one of the three R's in the above formula are hydroxyl-terminated polyester residues.

Among the ester-forming phosphorus compounds that can be used in this invention are phosphorus oxychloride, phosphorus pentoxide, phosphorus trichloride, phosphoric anhydride, and acetyl phosphate. Preferable among them is phosphorus oxychloride.

The reaction of the above-mentioned ester-forming phosphrous compound with a hydroxyl-terminated polyester should preferably be carried out in an organic solvent which is both inert to the reactants and reaction products and solubilizes them. Examples of such organic solvents include aliphatic saturated hydrocarbons such as octane, petroleum ether, ligroin, mineral spirit, and kerosene; aromatic hydro-carbons such as benzene, toluene, and xylene; halogenated aliphatic hydrocarbons such as trichloroethane and tetrachloroethane; and chlorinated aromatic hydrocarbons such as dichlorobenzene and trichloro-benzene. They have been used for the production of polyesters.

In the case where a halogenated phosphorus compound such as phosphorus oxychloride is used as the ester-forming phosphorus compound, it is desirable to use as a catalyst a tertiary amine such as triethylamine; an organic base such as pyridine, 2,6-lutidine, and 1,8-diaza-bicyclo-(5.4.0)undecene-7; or an inorganic base such as oxides, hydroxides, carbonates and organic acid salts of alkali metals or alkaline earth metals.

In the case where one or two of the three R's in the above formula are hydrogen atoms or cations (mentioned later), a cation source mentioned later should be added to the reaction mixture to form a salt when the reaction of an ester-forming phosphorus compound with 2 moles or 1 mole of hydroxyl-terminated polyester is substantially complete, or after the hydrolysis is performed as required (in the case where a halogenated phosphorus compound is used as an ester-forming phosphorus compound). The cation source may be added before, during, or after the application such as the production of a pigment composition using the phosphoric ester compound of this invention, which has one or two hydroxyl-terminated polyester residues, with the remaining R's being hydrogen ions.

The hydroxy-terminated polyester used is an already known aliphatic, alicyclic or aromatic hydroxy-terminated polyester. The molecular weight of the hydroxyl-terminated polyester used in the above-mentioned reaction is not critical. A dimer or a polymer having an average molecular weight lower than 10,000, preferably about 500 to 5,000, can be used.

The hydroxyl-terminated polyester as mentioned above is obtained by self-polycondensation of a hydroxy-carboxylic acid which has both a hydroxyl group and a carboxyl group on the molecule. The preferred hydroxy-carboxylic acid is one which has 4 to 30 carbon atoms. Examples of such hydroxy-carboxylic acids include ricinoleic acid, 12-hydroxy-stearic acid, castor oil fatty acid, hydrogenated castor oil fatty acid δ-hydroxy-valeric acid, ε-hydroxy-caproic acid, p-hydroxyethyloxbenzoic acid, and hydroxynaphthalene carboxylic acid. They may be used individually or in combination with one another.

It is also possible to use, in the same manner, a hydroxyl-terminated polyester obtained by esterifying an alcohol with the terminal carboxyl group of a polyester obtained from the above-mentioned hydroxy-carboxylic acid. Examples of the alcohol used for the terminal esterification are alcohols having 1 to 30 carbon atoms, such as methyl alcohol, ethyl alcohol, propyl alcohol, butyl alcohol, hexyl alcohol, octyl alcohol, decyl alcohol, dodecyl alcohol, tridecyl alcohol, hexadecyl alcohol, octadecyl alcohol, tetracosyl alcohol, hexacosyl alcohol, octadecenyl alcohol, cyclohexyl alcohol, and benzyl, alcohol.

The phosphoric ester compound of this invention is obtained by reacting 3 moles, 2 moles, or 1 mole of the above-mentioned hydroxyl-terminated polyester with 1 mole of the above-mentioned ester-forming phosphorus compound. Where 2 moles or 1 more of the above-mentioned polyester is reacted with 1 mole of the phosphorus compound, one or two R's other than polyester residues in the above-mentioned formula may be groups other than the above-mentioned polyester, such as residue of alcohol compounds, hydrogen atoms, inorganic cations, and organic cations. Examples of the alcohol residues are the residues of the above-mentioned ordinary alchohols, the hydroxy-carboxylic acid above-mentioned as the monomer and hydroxyl ester of the above-mentioned hydroxyl-carboxylic acid with the above-mentioned alcohol.

Examples of inorganic cations include alkaline metals such as sodium and potassium; polyvalent metals such as magnesium, calcium, strontium, barium, manganese, iron, cobalt, nickel, zinc, aluminum, and tin; and ammonium. Examples of organic cations include cations of primary, secondary, and tertiary monoamines and polyamines having 1 to 30 carbon atoms such as methylamine, ethylamine, propylamine, butylamine, hexylamine, octylamine, dodecylamine, octadecylamine, oleylamine, diethylamine, dibutylamine, distearylamine, triethylamine, tributylamine, dimethyloctylamine, dimethyldecylamine, dimethyldodecylamine, dimethyltetradecylamine, dimethylhexadecylamine, dimethyloctadecylamine, dimethyloleylamine, dilaurylmonomethylamine, trioctylamine, dimethylaniline, ethylenediamine, propylene diamine, hexamethylenediamine, and stearylpropylenediamine; quaternary ammoniums such as octadecyl trimethylammonium and dioctadecyl dimethylammonium; and alkanolamines such as ethanolamine, diethanolamine, triethanolamine, dimethylethanolamine, diethylethanolamine, propanolamine, and other alkanolamines obtained by adding ethylene oxide to the above-mentioned higher aliphatic amine. These amines can be used individually or in combination with one another. Where a higher aliphatic amine or ammonium derived from natural oils and fats is used as a raw material, it is possible to use a mixture of amines each differing in carbon number and degree of saturation as such.

The above-mentioned phosphoric ester compound of this invention comes in differet forms according to the substituent group R. The ones defined below are comparatively hydrophobic dispersants adequately soluble in an organic solvent, and is used diredtly or in solvent solution to make the surface of a material such as pigment hydrophobic or oily. (1) All of the three R's are residues of hydroxyl-terminated polyester. (2) The three R's are residues of hydroxyl-terminated polyester and residues of other alcohols. (3) One or two of the three R's are cations of a higher amine.

On the other hand, the compound of the above-formula in which one or two of the three R's are cations selected from the alkali metals, ammonium, lower amines, and lower alkanolamines, is a comparatively hydrophilic dispersant soluble or dispersible in water or aqueous solutions. A material such as pigment may also become hydrophobic or oily by treating, in the first, above-mentioned aqueous solution or dispersion and secondly reacting with polyvalent metallic compound, higher amine and so on.

The phosphoric ester compound containing a polyester chain of the present invention is not in danger of deterioration and putrefaction due to oxidation and rancidity, unlike lecithin as a natural phospholipid, which has been conventionally used as a pigment dispersant for paints, printing inks, and plastics colorants, It has good stability and produces an outstanding effect in the surface modification of pigments and the dispersion of pigments in a medium.

The phosphoric ester compound of this invention is readily adsorbed on the pigment surface due to the electronic attraction produced by the phosphoric ester linkage and the ester linkage contained therein and the affinity for mediums produced by the hydrocarbon chain contained therein. This adsorption improves the wettability, dispersibility, and flowability of pigments. Therefore, the phosphoric ester compound is useful as a dispersant in dispersing using a dispersing machine or a mixing machine. In addition, the phosphoric ester compound is useful as a flushing agent for the aqueous filter cake of pigment. It makes the pigment surface lipophilic or hydrophobic, permitting effective flushing of pigments.

In addition, the phosphoric ester compound of this invention is also useful for such additive as a dispersant in a medium a fine solid particle such as magnetic recording material; an electroconductive substance such as metallic fiber, high-structure carbon black, carbon fiber; material for electromagnetic interference; ceramic raw material and so on.

The invention is now described in more detail with reference to examples. (In examples, quantities are expressed as parts by weight or percent by weight.)

EXAMPLE 1

(1) Synthesis of hydroxyl-terminated polyester from 12-hydroxy-stearic acid and methylesterification thereof.

Into a four-mouth glass reactor equipped with a stirrer, thermometer, reflux condenser with a moisture distilling tube, and inlet and placed in an oil bath were charged 100 parts of 12-hydroxystearic acid and 100 parts of toluene, followed by stirring for dissolution. After heating, there was added 1.0 part of p-toluenesulfonic acid as a polycondensation catalyst. The reaction liquid was heated to 120° C. to promote the polycondensation of 12-hydroxystearic acid. The progress of the reaction was measured by means of the volume of distilled water and the infrared absorption spectrum of the reaction product after the lapse of 60 minutes, 120 minutes, and 180 minutes. After 200 minutes, the polycondensation reaction was terminated by cooling.

When the reactants were cooled to 63° C., there were added 50 parts of methanol, 100 parts of methyl acetate, and 0.5 parts of p-toluene-sulfonic acid. The reactants were heated to 110° C., with distillation of the solvent, to perform the methylesterification of the terminal carboxyl group of the polyester. When 150 parts of solvent had been distilled away, the reactants were cooled to 63° C. Then 200 parts of methanol were added and the solvent was distilled away by heating to 110° C. The total amount distilled away was 245 parts.

The methylesterification took about 5 hours. After the reaction, 300 parts of water were added to the reaction mixture to extract water-soluble components from the reaction mixture. The oil layer was collected from the separating two layers. For dehydration of the oil phase, 150 parts of toluene and 200 parts of methanol were added, followed by heating to 130° C. with blowing of nitrogen gas. Thus, water and solvents, 345 parts in total, were distilled away.

The reaction product thus obtained was an amber liquid. It was identified a methyl ester of as a self-polycondensation polyester of 12-hydroxystearic acid by the infrared absorption spectrum and gel permeation chromatograph.

It was confirmed by the acid value of the reaction product that the methylesterifiaction of the terminal carboxyl group of the polyester was almost complete. The hydroxyl value of the reaction product was 40.8. This indicates that 1 gram equivalent of the methyl ester of the self-polycondensation polyester of 12-hydroxystearic acid is 1,375 and the avarage degree of polycondensation is about 5.

(2) Synthesis of phosphoric triester compound:

Into a four-mouth glass reactor equipped with a stirrer, thermometer, dropping funnel, and reflux condenser and placed in a water bath were charged 188.2 parts of the methyl ester of the polyester obtained in the above-mentioned step (1) (1 gram equivalent was 1,375), 188.2 parts of benzene, and 16.6 parts of triethylamine, followed by stirring and dissolution. The dropping funnel was filled with 7.0 parts of phosphorus oxychloride.

The equivalent ratio of the hydroxyl-terminated polyester, phosphorus oxychloride, and triethylamine was 3:3:3.6.

While stirring and cooling the reaction mixture (below 10° C.), phosphorus oxychloride was added dropwise from the dropping funnel over 30 minutes. After addition, the reaction was continued for 2 hours with stirring, followed by cooling.

For the removal of triethylamine (as a dehydrochlorination catalyst) and triethylamine hydrochloride, the reaction mixture was washed with an equal amount of deionized water, half an amount of water acidified with hydrochloric acid, and three times with half an amount of deionized water using a separatory funnel. The washed benzene layer was dried with sodium sulfate and benzene was distilled away under vacuum. Thus there was obtained a brown liquid reaction porduct.

The reaction product was identified as a phosphoric triester compound of the methyl ester of the self-polycondensation polyester of 12-hydroxy-stearic acid by the infrared absorption spectrum and gel permeation chromatograph. The average molecular weight of the principal component of this compound was 4,200.

The above-mentioned phosphoric triester compound of the methyl ester of the poly-12-hydroxystearic acid is effective on the high concentrated charging of pigment, on the reduction of dispersing time and on dispersibility in the dispersion of a pigment such as copper phthalocyanine blue pigment, copper phthalocyanine green pigment, azo lake pigment, insoluble azo pigment, carbon black pigment and so on. It is also effective as a flushing agent in the flushing of an aqueous press cake of pigment.

EXAMPLES 2 TO 12

Various phosphoric triester compounds were prepared in the same manner as step (2) in Example 1, except that the reactants were replaced by those which are shown in Table 1 below.

TABLE 1

| No. | Reactants | Ave. M.W. | (I)* | (II)** |
|---|---|---|---|---|
| 2 | Methyl ester of poly-12-hydroxy-stearic acid | 880 | 3 | 2600 |
|   | Phosphorus oxychloride |  | 3 |  |
| 3 | Methyl ester of polyricinolic acid | 1430 | 3 | 4300 |
|   | Phosphorus oxychloride |  | 3 |  |
| 4 | Butyl ester of poly-12-hydroxy-stearic acid | 920 | 3 | 2800 |
|   | Phosphorus oxychloride |  | 3 |  |
| 5 | Butyl ester of polyricinolic acid | 1470 | 3 | 4500 |
|   | Phosphorus oxychloride |  | 3 |  |
| 6 | Dodecyl ester of poly-12-hydroxy-stearic acid | 1310 | 3 | 4000 |
|   | Phosphorus oxychloride |  | 3 |  |
| 7 | Oleyl ester of polyricinolic acid | 1110 | 3 | 3400 |
|   | Phosphorus oxychloride |  | 3 |  |
| 8 | Tridecyl ester of poly-12-hydroxy-stearic acid | 1050 | 3 | 3200 |
|   | Phosphorus oxychloride |  | 3 |  |
| 9 | Oleyl ester of poly-ε-caproic acid | 960 | 3 | 2900 |
|   | Phosphorus oxychloride |  | 3 |  |
| 10 | Monoalcohol of polyester of azelaic acid, hexamethylene glycol, and lauric acid (3:4:1 molar ratio) | 1100 | 3 | 3300 |
|   | Phosphorus oxychloride |  | 3 |  |
| 11 | Poly-12-hydroxystearic acid | 860 | 3 | 2600 |
|   | Phosphorus oxychloride |  | 3 |  |
| 12 | Polyricinolic acid | 860 | 3 | 2600 |
|   | Phosphorus oxychloride |  | 3 |  |

*Amount of the reactants (in equivalents)
**Average molecular weight of the principal component of the resulting phosphoric triester.

EXAMPLE 13

Into a four-mouth glass reactor (the same one as used in step (2) in Example) equipped with a stirrer, thermometer, dropping funnel, and reflux condenser were charged 23.6 parts of phosphorus oxychloride. 147.7 parts of methyl ester of poly-12-hydroxystearic acid having an average molecular weight of 1440 (separately prepared in the same manner as in step (1) in Example 1), which had been mixed with and dissolved in 147.7 parts of benzene and 12.5 parts of triethylamine, were slowly added dropwise at 5° to 10° C. over 2 hours. The reaction was carried out at 10° C. for 1 hour. Further, 30.8 parts of the methyl ester of the poly-12-hydroxystearic acid having an average molecular weight of 600 (prepared in the same manner as above), which had been mixed with and dissolved in 30.8 parts of benzene and 6.2 parts of triethylamine, was slowly added dropwise at 10° to 20° C., over 1 hour. The reaction was carried out for 1 hour each at 20° C., 40° C., and 60° C. and for 2 hours at 80° C. with stirring. Finally, the reaction product was cooled.

The molar ratio of polyester (average molecular weight 1440), polyester (average molecular weight 600), phosphorus oxychloride, and triethylamine was 2:1:3:3.6.

The cooled reaction product was washed, purified, dried, concentrated, and desolvated in the same manner as in step (2) of Example 1. Thus there was obtained a brown liquid.

The reaction product was identified as a phosphoric triester of the methyl ester of the poly-12-hydroxystearic acid in the same way as in step (2) of Example 1. The average molecular weight of the principal component of this compound was about 3,500. Thus, the obtained compound is effectively used as a dispersant, flushing agent of pigment, and so on, same as the phosphoric triester compound of Example 1.

EXAMPLES 14 TO 19

Various phosphoric triester compounds were prepared in the same manner as in Example 13, except that the reactants were replaced by those which are shown in Table 2 below. These phosphoric triester compounds are effectively used as a dispersant, flushing agent of pigment, and so on, same as the phosphoric triester compound of Example 1.

TABLE 2

| No. | Reactants | Ave. M.W. | (I)* | (II)** |
|---|---|---|---|---|
| 14 | Methyl ester of poly-12-hydroxy-stearic acid | 1440 | 2 | |
|  | Methyl ester of polyricinolic acid | 590 | 1 | 3500 |
|  | Phosphorus oxychloride | | 3 | |
| 15 | Methyl ester of polyricinolic acid | 1430 | 2 | |
|  | Methyl ester of polyricinolic acid | 590 | 1 | 3500 |
|  | Phosphorus oxychloride | | 3 | |
| 16 | Methyl ester of poly-12-hydroxy-stearic acid | 2010 | 2 | |
|  | Butyl ester of 12-hydroxystearic acid | | 1 | 4400 |
|  | Phosphorus oxychloride | | 3 | |
| 17 | Methyl ester of polyricinolic acid | 2830 | 1 | |
|  | Mixture of dodecyl ester and tridecyl esters of ricinolic acid | | 2 | 3900 |
|  | Phosphorus oxychloride | | 3 | |
| 18 | Methyl ester of poly-12-hydroxy-stearic acid | 2010 | 2 | |
|  | Dodecyl alcohol | | 1 | 4200 |
|  | Phosphorus oxychloride | | 3 | |
| 19 | Methyl ester of polyricinolic acid | 2830 | 1 | |
|  | Oleyl alcohol | | 2 | 3400 |
|  | Phosphorus oxychloride | | 3 | |

*Amount of the reactants (in equivalents)
**Average molecular weight of the principal component of the resulting phosphoric triester.

EXAMPLE 20

Synthesis of a phosphoric diester compound:

A four-mouth glass reactor equipped with a stirrer, thermometer, dropping funnel, and reflux condenser and a water bath were provided. The reflux condenser was connected to a safety bottle and a hydrogen chloride gas absorbing bottle which was further connected to a vacuum pump and mercury manometer.

In the reactor was charged 7.0 parts of phosphorus oxychloride. The dropping funnel was filled with 62.8 parts of the methyl ester of the polyester (1 gram equivalent=1,375) obtained in step (1) in Referential Example (1) and 62.8 parts of benzene as a solvent.

With the reactor cooled with iced water, the benzene solution was added dropwise at 5° to 10° C. The reactants were stirred at 10° C. for 1 hour. The reactor was gradually evacuated while increasing the reaction temperature. Hydrogen chloride gas formed by the reaction was absorbed by an aqueous solution of sodium hydroxide filled in the absorbing bottle. The reaction temperature was gradually raised to 40° C. and the reaction system was gradually evacuated to 100 mmHg over 5 hours. When the evolution of hydrogen chloride gas was not noticed any longer, the reaction system was cooled. In this state, the reaction system contains phosphoric (methyl ester of poly-12-hydroxystearic acid) monoester dichloride. The dropping funnel was filled with 62.8 parts of the above-mentioned methyl ester of the polyester, 62.8 parts of benzene, and 4.62 parts of triethylamine, followed by mixing and dissolution. The resulting solution was added dropwise at 10° to 20° C. to the reactor over 60 minutes, followed by stirring for 2 hours. The reaction temperature was raised to 40° C. over 2 hours, and stirring was continued for 2 hours. The reactor was cooled.

The equivalent ratio of the hydroxyl-terminated polyester, phosphorus oxychloride, and triethylamine was 2:3:1.

The reaction liquid was washed with water, a dilute aqueous solution of sodium hydroxide, a dilute aqueous solution of hydrochloric acid, and water, for the dechlorination (hydrolysis) of the phosphoric ester chloride and removal of chloride and the removal of triethylamine hydrochloride. The washed benzene layer was dried with sodium sulfate, and benzene was distilled away under reduced pressure. Thus there was obtained a brown liquid reaction product.

It was confirmed by infrared absorption spectrum and gel permeation chromatograph that the reaction product is composed mainly of a phosphoric diester compound of the methyl ester of the self-polycondensation polyester of 12-hydroxystearic acid.

The average molecular weight of the principal component was 2,500 to 2,800.

The amine salt and metal salt were obtained by neutralizing the phosphoric radical of the above-mentioned hposphoric diester of the methyl ester of the poly-12-hydroxystearic acid with rosin amine, cocomut amine, beef tallow propylene-diamine and hydroxides of calcium, stronyium and aluminum. The above-obtained phosphoric diester of the mithyl ester of the poly-12-hydroxystearic acid and amine salt and metal salt thereof are effective on the high concentrated charging of pigment, on the reduction of dispersing time and on dispersibility in the dispersion of pigment such as copper hythalocyamine blue pigment, copper hythalocyanine green pigment, azo like pigment, insoluble azo pigment, carbon black pigment. And those are also effective as flushing agent in the flushing of an aqueous press cake of pigment.

EXAMPLE 21 TO 30

Various phosphoric diester compounds were prepared in the same manner as in Example 20, except that the reactants were replaced by those which are shown in Table 3 below.

TABLE 3

| No. | Reactants | Ave. M.W. | (I)* | (II)** |
|---|---|---|---|---|
| 21 | Methyl ester of poly-12-hydroxystearic acid | 800 | 2 | 1600 to 1800 |
|  | Phosphorus oxychloride |  | 3 |  |
| 22 | Methyl ester of polyricinolic acid | 1430 | 2 | 2600 to 2900 |
|  | Phosphorus oxychloride |  | 3 |  |
| 23 | Butyl ester of poly-12-hydroxystearic acid | 920 | 2 | 1700 to 1900 |
|  | Phosphorus oxychloride |  | 3 |  |
| 24 | Butyl ester of polyricinolic acid | 1470 | 2 | 2700 to 3000 |
|  | Phosphorus oxychloride |  | 3 |  |
| 25 | Dodecyl ester of poly-12-hydroxystearic acid | 1050 | 2 | 1900 to 2100 |
|  | Phosphorus oxychloride |  | 3 |  |
| 26 | Benzyl ester of polyricinolic acid stearic acid | 1110 | 2 | 2200 to 2200 |
|  | Phosphorus oxychloride |  | 3 |  |
| 27 | Benzyl ester of poly-12-hydroxystearic acid | 1236 | 2 | 2200 to 2500 |
|  | Phosphorus oxychloride |  | 3 |  |
| 28 | Oleyl ester of poly-ε-caproic acid | 950 | 2 | 1800 to 2000 |
|  | Phosphorus oxychloride |  | 3 |  |
| 29 | Poly-12-hydroxystearic acid | 860 | 2 | 1600 to 1800 |
|  | Phosphorus oxychloride |  | 3 |  |
| 30 | Polyricinolic acid | 860 | 2 | 1600 to 1800 |
|  | Phosphorus oxychloride |  | 3 |  |

*Amount of the reactants (in equivalents)
**Average molecular weight of the principal component of the resulting phosphoric diester.

EXAMPLE 31

Into the same four-mouth glass reactor as used in Example 21, which was equipped with a stirrer, thermometer, dropping funnel, evacuating system, and hydrogen chloride gas absorber, was charged 7.0 parts of phosphorus oxychloride.

The dropping funnel was filled with 65.8 parts of the methyl ester of poly-12-hydroxystearic acid (average molecular weight=1,440) prepared in the same manner as in step (1) of Example 1, and 65.8 parts of benzene as a solvent. The reaction was carried out in the same manner as in Example 21 to give phosphoric (methyl ester of poly-12-hydroxystearic acid) monoester dichloride. Then, 27.4 parts of the methyl ester of poly-12-hydroxystearic acid (average molecular weight=600) prepared in the same manner as in step (1) of Example 1 was mixed with and dissolved in 27.4 parts of benzene and 4.62 parts of triethylamine. The reaction was carried out in the same manner as in Example 21.

The equivalent ratio of the polyester (average molecular weight=1,440), the polyester (average molecular weight=600), phosphorus oxychloride, and triethylamine was 1:1:3:1.

After cooling, the reaction liquid underwent dechlorination (hydrolysis), washing, purification, drying, concentration, and desolvation in the same manner as in Example 21. Thus there was obtained a brown liquid reaction product.

It was confirmed by infrared absorption spectrum and gel permeation chromatograph that the reaction product is composed mainly of a phosphoric diester of methyl ester of poly-12-hydroxystearic acid.

The average molecular weight of the principal component was about 1,900 to 2,100.

The phosphoric diester and amine salt and methal salt thereof are effective used as dispersant and flushing agent of pigment same as the phoshporec diester of Example 20.

EXAMPLES 32 TO 39

Various phosphoric diester and monoester compounds were prepared in the same manner as in Example 31, except that the reactants were replaced by those which are shown in Table 4 below.

The phosphoric diester and monoester and amine salt and metal salt thereof are effectively used as dispersant and flushing agent same as the phosphoric diester of Example 20.

TABLE 4

| No. | Reactants | Ave. M.W. | (I)* | (II)** |
|---|---|---|---|---|
| 32 | Methyl ester of poly-12-hydroxystearic acid | 1440 | 1 |  |
|  | Methyl ester of polyricinolic acid | 590 | 1 | 1900 to 2100 |
|  | Phosphorus oxychloride |  | 3 |  |
| 33 | Methyl ester of polyricinolic acid | 1430 | 1 |  |
|  | Methyl ester of polyricinolic acid | 590 | 1 | 1900 to 2100 |
|  | Phosphorus oxychloride |  | 3 |  |
| 34 | Methyl ester of poly-12-hydroxystearic acid | 2010 | 1 | 1600 to 1800 |
|  | Butyl ester of 12-hydroxystearic acid |  | 1 |  |
|  | Phosphorus oxychloride |  | 3 |  |
| 35 | Methyl ester of polyricinolic acid | 1430 | 1 |  |
|  | Butyl ester of ricinolic acid |  | 1 | 1600 to 1800 |
|  | Phosphorus oxychloride |  | 3 |  |
| 36 | Methyl ester of poly-12-hydroxystearic acid | 1375 | 1 |  |
|  | Dodecyl alcohol |  | 1 | 1400 to 1600 |
|  | Phosphorus oxychloride |  | 3 |  |
| 37 | Methyl ester of polyricinolic acid | 1430 | 1 |  |
|  | Oleyl alcohol |  | 1 | 1500 to 1700 |
|  | Phosphorus oxychloride |  | 3 |  |
| 38 | Methyl ester of poly-12-hydroxystearic acid | 1375 | 1 | 1400 to 1500 |
|  | Phosphorus oxychloride |  | 3 |  |
| 39 | Methyl ester of polyricinolic acid | 1430 | 1 | 1400 to 1500 |
|  | Phosphorus oxychloride |  | 3 |  |

*Amount of the reactants (in equivalents)
**Average molecular weight of the principal component of the resulting phosphoric diester or monoester.

What is claimed is:

1. A phosphoric ester compound represented by the formula

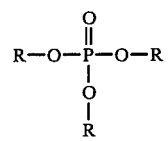

where at least one R is a polyester residue derived from an aliphatic hydroxyl-terminated polyester obtained by heating an aliphatic hydroxy-carboxylic acid having 4 to 30 carbons atoms to achieve self-polycondensation to form a polyester having an average molecular weight of about 500 to 5,000, and any remaining R is a hydrogen atom, a cation, or a residue of an alcohol.

2. A phosphoric ester compound as set forth in claim 1, wherein each R is the polyester residue derived from the hydroxyl-terminated polyester obtained from a hydroxy-carboxylic acid.

3. A phosphoric ester compound as set forth in claim 1, wherein two of the R's are the polyester residues derived from the hydroxyl-terminated polyester obtained from a hydroxy-carboxylic acid.

4. A phosphoric ester compound as set forth in claim 1, wherein one R is the polyester residue derived from the hydroxyl-terminated polyester obtained from a hydroxy-carboxylic acid.

5. A phosphoric ester compound as set forth in claim 1, wherein the hydroxyl-terminated polyester obtained from a hydroxy-carboxylic acid is a polyester obtained from at least one hydroxy-carboxylic acid selected from the group consisting of ricinolic acid, hydroxystearic acid, castor oil fatty acid, hydrogenated castor oil fatty acid, hydroxyvaleric acid, and hydroxycaproic acid.

* * * * *